US009528475B2

(12) United States Patent
Styles et al.

(10) Patent No.: US 9,528,475 B2
(45) Date of Patent: Dec. 27, 2016

(54) METHOD AND SYSTEM FOR EGR CONTROL

(71) Applicant: Ford Global Technologies, LLC, Dearborn, MI (US)

(72) Inventors: Daniel Joseph Styles, Canton, MI (US); Michael Howard Shelby, Plymouth, MI (US); James Alfred Hilditch, Canton, MI (US); Michael Damian Czekala, Canton, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 14/538,520

(22) Filed: Nov. 11, 2014

(65) Prior Publication Data

US 2016/0131088 A1    May 12, 2016

(51) Int. Cl.
F02B 47/08 (2006.01)
F02M 25/07 (2006.01)
F02D 21/08 (2006.01)
F02M 25/022 (2006.01)
F02D 13/02 (2006.01)
F02D 41/00 (2006.01)

(52) U.S. Cl.
CPC .............. *F02M 26/04* (2016.02); *F02D 21/08* (2013.01); *F02M 25/0227* (2013.01); *F02M 26/05* (2016.02); *F02M 26/06* (2016.02); *F02M 26/24* (2016.02); *F02M 26/25* (2016.02); *F02M 26/32* (2016.02); *F02M 26/33* (2016.02); *F02M 26/36* (2016.02); *F02M 26/50* (2016.02); *F02D 13/0207* (2013.01); *F02D 41/005* (2013.01); *F02D 41/0065* (2013.01)

(58) Field of Classification Search
CPC ...... F01N 3/08; Y02T 10/121; F02B 29/0493; F02M 25/028
See application file for complete search history.

(56) References Cited

U.S. PATENT DOCUMENTS

| | | | |
|---|---|---|---|
| 6,301,888 B1 * | 10/2001 | Gray, Jr. ............ | B01D 53/9495 123/568.11 |
| 6,360,541 B2 * | 3/2002 | Waszkiewicz .......... | F02B 33/44 123/568.12 |
| 6,668,766 B1 | 12/2003 | Liederman et al. | |
| 6,904,898 B1 * | 6/2005 | Sahlen .................. | Y02T 10/121 123/568.12 |
| 6,993,909 B2 * | 2/2006 | Matsunaga .......... | F02D 41/0072 123/568.12 |
| 7,971,577 B2 * | 7/2011 | Styles ..................... | F28G 13/00 123/568.12 |

(Continued)

FOREIGN PATENT DOCUMENTS

WO    2013080266 A1    6/2013
WO    2014080266 A1    5/2014

*Primary Examiner* — Mahmoud Gimie
*Assistant Examiner* — David Hamaoui
(74) *Attorney, Agent, or Firm* — Julia Voutyras; Alleman Hall McCoy Russell & Tuttle LLP

(57) ABSTRACT

Methods and systems are provided for engine dilution control via direct injection of water from a reservoir. In one example, a method may include during select conditions, direct injecting fluid from a reservoir into an EGR cooler. This approach can be used to supplement EGR flow during situations that decrease EGR flow.

14 Claims, 7 Drawing Sheets

(56) References Cited

U.S. PATENT DOCUMENTS

| | | | | |
|---|---|---|---|---|
| 8,104,456 B2* | 1/2012 | Yacoub | ............... | F02B 37/00 |
| | | | | 123/25 A |
| 9,038,580 B2* | 5/2015 | Surnilla | ............ | F02D 41/0025 |
| | | | | 123/25 C |
| 9,051,901 B2* | 6/2015 | Rumpsa | ............... | F02D 21/08 |
| 9,103,247 B2* | 8/2015 | Yacoub | ............... | F01N 9/00 |
| 9,239,020 B2* | 1/2016 | Fulton | ............ | F02B 29/0468 |
| 2010/0139269 A1* | 6/2010 | Heyes | ............... | F01N 3/2006 |
| | | | | 60/602 |
| 2010/0242929 A1* | 9/2010 | Kardos | ............ | F02B 29/0431 |
| | | | | 123/568.12 |
| 2013/0180508 A1* | 7/2013 | Zagone | ............... | F02M 25/07 |
| | | | | 123/568.11 |
| 2013/0218438 A1* | 8/2013 | Surnilla | ............ | F02D 41/0025 |
| | | | | 701/102 |
| 2014/0020362 A1* | 1/2014 | Warey | ............... | F01N 3/08 |
| | | | | 60/274 |
| 2015/0047603 A1* | 2/2015 | Surnilla | ............ | F02D 41/0007 |
| | | | | 123/350 |
| 2015/0354437 A1* | 12/2015 | Mulye | ............... | F02B 47/02 |
| | | | | 123/25 C |

* cited by examiner

METHOD AND SYSTEM FOR EGR CONTROL

FIELD

The present description relates generally to methods and systems for controlling a vehicle engine exhaust gas recirculation (EGR).

BACKGROUND/SUMMARY

Exhaust gas recirculation (EGR) systems are being increasingly utilized to improve engine efficiency and reduce the harmful effects of exhaust emissions on the environment. As an engine burns fuel, it produces an exhaust gas containing unburned fuel, also known as hydrocarbons (HC), carbon monoxide (CO), and nitrous oxides ($NO_x$). The exhaust gas is redirected through the engine to consume the unburned fuel and results in a dilution of the combustion mixture. This dilution results in a reduction of the percentage of fresh intake air in the combustion mixture and leads to reduced formation of CO and $NO_x$. Burning the exhaust gas before it is released reduces the harmful effects of the exhaust gas on the atmosphere and enables the vehicle to meet government emission standards.

EGR systems typically include an EGR cooler that cools the EGR as it flows back to the engine intake. Cooled external EGR is proposed to improve fuel economy on gasoline engines via reducing throttling losses, reducing in-cylinder heat losses, mitigating knock, and decreasing enrichment requirements. As EGR passes through the EGR cooler, fouling of the cooler may occur via deposition of particulate matter in the cooler. For typical EGR systems, EGR coolers require replacement after a certain amount of fouling. Fouling of the EGR cooler reduces the cooling effectiveness of the EGR cooler, increases its pressure drop, and reduces the ability of the cooled EGR to increase fuel economy by minimizing its in-cylinder benefits and flow capacity.

Further, cooled EGR systems reach limits, reducing the benefits of cooled EGR. In high load EGR systems, such as gasoline turbocharged direct injection (GTDI) low pressure (LP) EGR, coolant flow or radiator heat rejection limitations can result in reduced EGR rates or even result in inability to flow any EGR. In transient cases, external EGR is frequently turned off to help improve torque response of the engine including maximizing turbo response.

Another issue with EGR systems is an inability to meet engine dilution requirements. Modern methods have been introduced to supplement EGR systems and meet engine dilution demands. One example approach is shown by Liederman et al. in U.S. Pat. No. 6,668,766. Therein, a direct injector is coupled to an engine cylinder and the injector is activated to inject water to the cylinder when EGR is unable to meet dilution requirements.

However, the inventors have recognized potential issues with such systems. As one example, direct injection of water at an engine cylinder does not allow the system to clean the EGR cooler when a particulate matter load is greater than a threshold particulate load. As a result, if the EGR cooler had a high amount of particulate matter, then EGR flow to the engine would be compromised. As a result, a standard cooler regeneration would be carried out, which typically reduces fuel economy. This may lead to unstable combustion and degrading engine performance and emissions.

Accordingly, methods and systems are provided herein in order to at least partly address the above issues. In one example, an engine method comprises, in response to a dilution requirement, direct injecting fluid at an EGR cooler. A rate of the direct injecting may be based on each of an EGR flow rate and an estimate of compressor blade speed.

Herein, the inventors have found direct injecting water at an EGR cooler can help meet engine dilution demands and/or clean the EGR cooler. For example, the EGR cooler direct injection may be halted or reduced during conditions of high compressor blade speeds in order to reduce damage to the blades that may occur if the injection were to dislodge any particulate matter stored in the cooler. Further, the direct injector may be used during instances of limited EGR flow to meet engine dilution demands, and/or enable increased EGR by limiting over-temperature issues in the compressor and/or EGR cooler. Direct injection of water into the EGR cooler to meet dilution demands may improve engine performance and efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Hereafter, embodiments of EGR system control are described more specifically referring to the appended drawings. Note that the following description of embodiments are exemplary, and various alternative embodiments may also be used.

The following description relates to a method for an exhaust gas recirculation (EGR) cooler with an injection port coupled to a reservoir. In one example, the EGR cooler is coupled to the reservoir via an injection valve with a nozzle able to atomize spray a fluid into the cooler. The amount of fluid injected in the cooler may be adjusted to control EGR temperature, concentration, pressure, condensate level, and residue level within the cooler (e.g., via feedback control). In another example, the reservoir may be coupled to a heater and contain water as the major fluid.

However, it is also possible to dispense with the heater by adding an ethanol/water mixture to the reservoir in order to prevent freezing.

Figure 1:
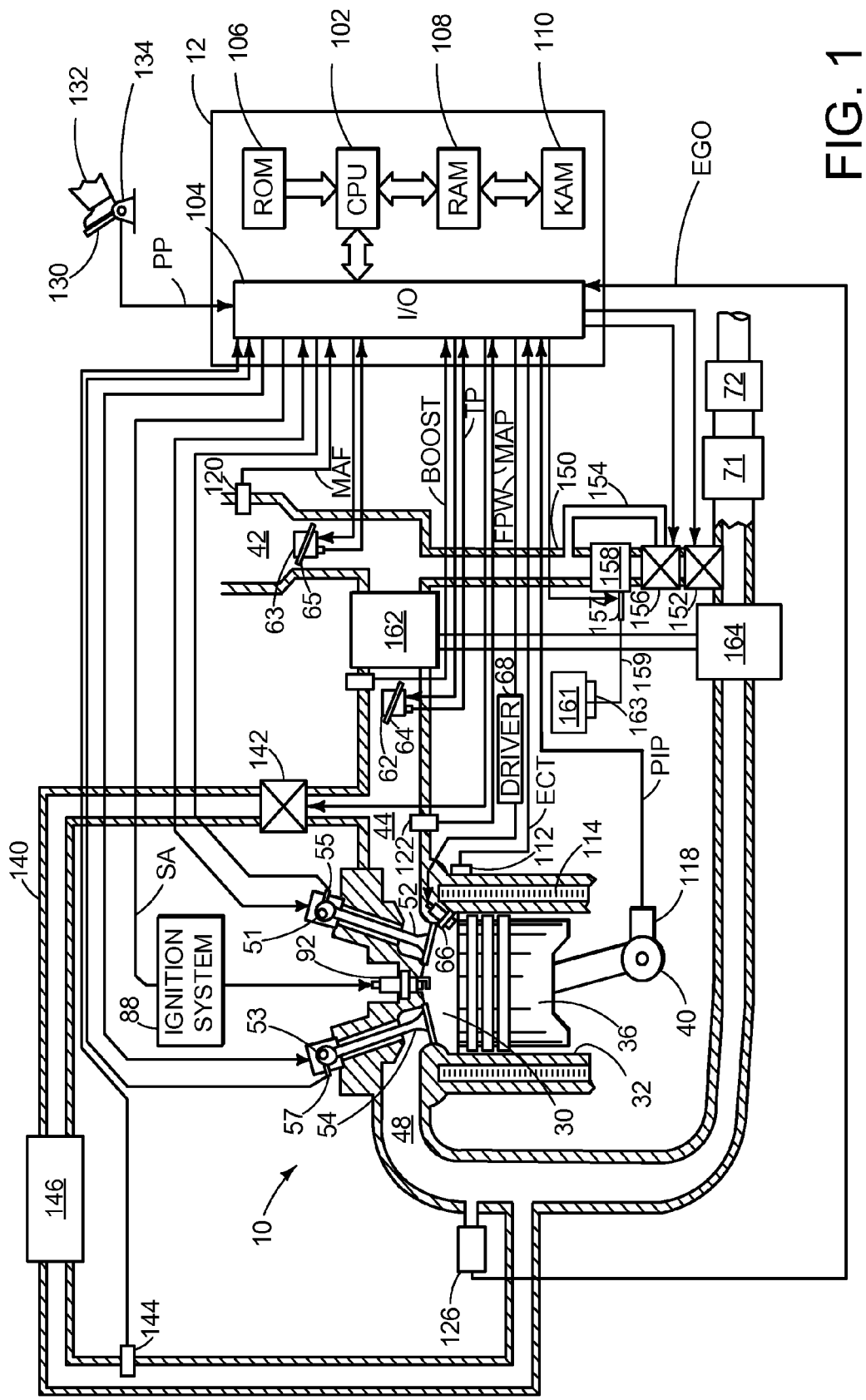
FIG. 1 shows a schematic diagram of an engine with a turbocharger and an exhaust gas recirculation system.

Referring now to FIG. 1, a schematic diagram of one cylinder of an engine having a plurality of cylinders 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

Figure 2:
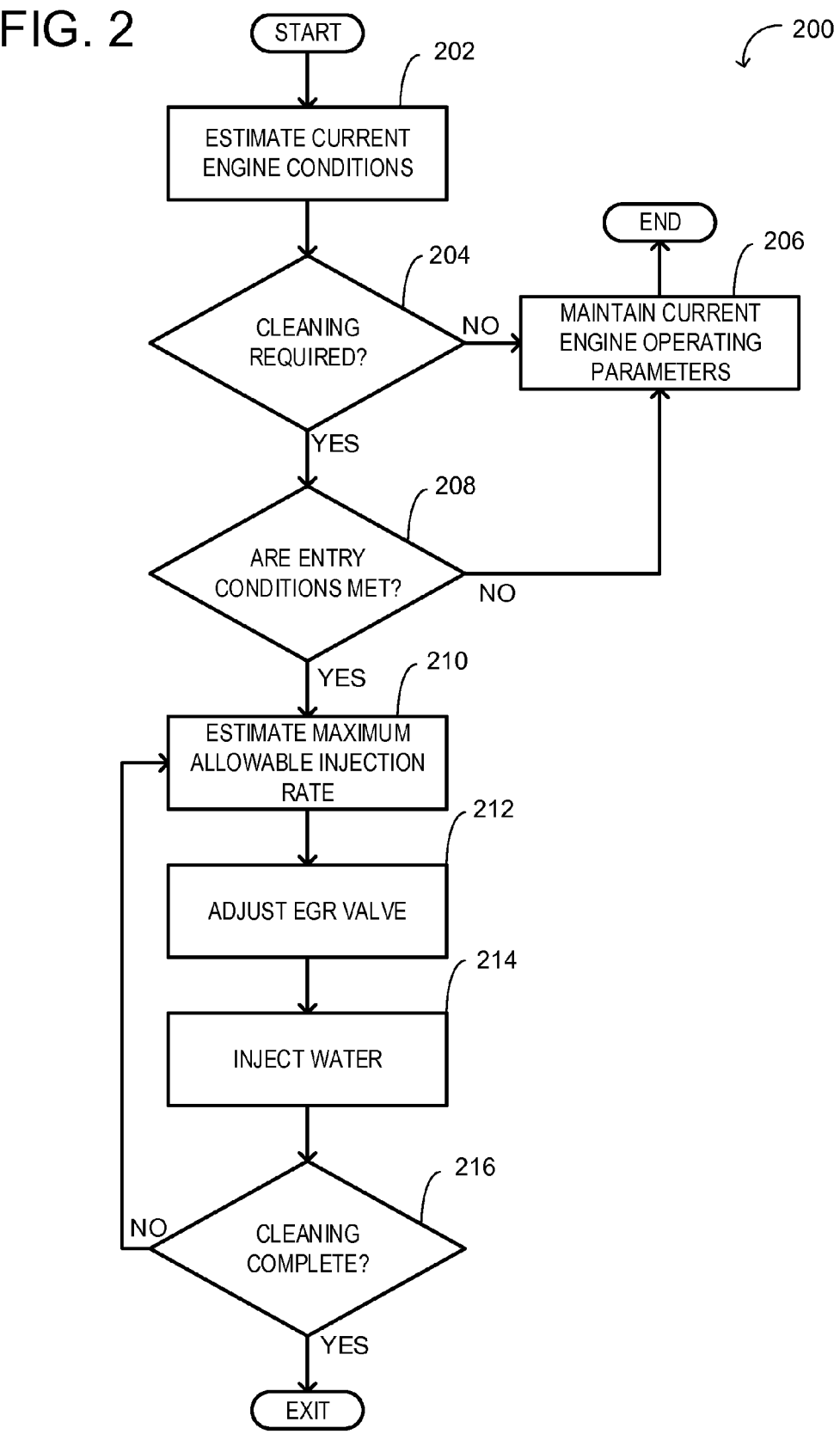
FIG. 2 shows a flow chart illustrating an example method for cleaning an EGR cooler with a water injection.

A direct injector 157 is coupled to LP-EGR cooler 158 close to the EGR cooler inlet, also known as the "hot" end. Further, the direct injector 157 is coupled to controller 12 and may be controlled by the controller through various conditions described below. The direct injector is part of a water injecting system including a conduit 159 attached to a water reservoir 161 and leading to the direct injector. The reservoir is coupled to a heater 163 to reduce formation of ice within the reservoir. In other embodiments, the reservoir may contain a fluid comprising of a mixture of liquids (e.g., water and ethanol) to remove the requirement of a heater. FIG. 2 describes when such an injection system may be used.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1). Further, in some embodiments, during operation of engine 10, emission control devices 71 and 72 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc. FIG. 1 shows an EGR cooler coupled to a water reservoir in a turbocharged engine with a GTDI LP and HP EGR systems, however, the EGR cooler may be used in different configurations (e.g., naturally aspirating engine).

As described previously, water reservoir 161 provides water to direct injector 157 at EGR cooler 158. This method may be used to meet engine dilution demands or to reduce particulate matter within the EGR cooler. Functions of the system are determined by controller 12 and are explained further in FIG. 2.

FIG. 2 is a flow chart illustrating an example method 200 for injecting water into an EGR cooler during an EGR cooler clean-out cycle. During select conditions, the method may include direct injecting fluid from a reservoir into an EGR cooler, where the select conditions include a particulate load at the EGR cooler being higher than a threshold particulate load. As described above, the direct injection into the EGR cooler may be done with water. A heater (e.g., heater 163) may be coupled to a water reservoir (e.g., water reservoir 161) to prevent formation of ice. In some examples, the direct injection may also be accomplished with a fluid mixture (e.g., water and methanol/ethanol/glycol). The heater may be dispensed with if the fluid mixture is utilized because of the lower freezing point of the mixture compared to the freezing point of water. Further, if the reservoir comprises a fluid mixture, then the controller may adjust fuel injection parameters to account for the alcohol in the injection to maintain an air/fuel ratio at or around stoichiometry.

Method 200 will be described herein with reference to components and systems depicted in FIG. 1, particularly, regarding heater 163, water reservoir 161, conduit 159, direct injector 157, and LP EGR cooler 158. Method 200 may be carried out by a controller (e.g., controller 12) according to computer-readable media stored thereon. It should be understood that the method 200 may be applied to other systems of a different configuration without departing from the scope of this disclosure.

Method 200 may begin at 202, wherein engine operating conditions may be estimated and/or measured. The engine operating conditions may include, but are not limited to engine speed, engine load, engine temperature, exhaust pressure, exhaust temperature, compressor speed, and commanded air/fuel ratio. At 204, the method 200 includes determining an EGR cooler cleaning demand. The EGR cooler cleaning demand may be determined by a measurement or model. As one example, the measurement may include determining a particulate load in the EGR cooler being greater than a threshold particulate load. Particulate matter load may be determined by measuring a change in an EGR pressure upstream and downstream of the EGR cooler. A particulate matter load above the threshold particulate load may create a flow blockage, causing the pressure change across the EGR cooler to increase. Therefore, if a pressure change across the EGR cooler is greater than a threshold EGR cooler pressure, then the EGR cooler may be fouled. As another example, particulate matter load may be determined by measuring a temperature of EGR downstream and upstream of the EGR cooler. Particulate matter load above the threshold particulate load in the EGR cooler may reduce heat transfer properties between the EGR and the EGR cooler. The particulate matter may reduce an amount of surface contact between the EGR cooler and the EGR. As a result, the temperature of EGR downstream of the EGR cooler may be higher than a threshold cooled EGR temperature.

The model to determine the EGR cleaning demand may include a scheduled periodic maintenance, such as after a pre-determined number of miles driven (e.g., 5000) or hours of usage (e.g., 100). If a controller (e.g., controller 12) determines an EGR cooler cleaning demand, then the method proceeds to 208. The method proceeds to 206 if no EGR cooler cleaning demand is detected. At 206, the controller maintains current engine operating parameters and a direct injection does not occur. The method may then exit.

At 208, the method includes determining if direct injection conditions are met. The direct injection conditions may include adjusting an amount of water direct injected based on an EGR cooler temperature being above a threshold EGR cooler temperature, a compressor speed being below a threshold speed, and if a reservoir (e.g., reservoir 161) has fluid available for direct injection. If the EGR cooler temperature is below a threshold EGR cooler temperature then the fluid in the direct injection may not fully vaporize. Incomplete vaporization leads to poor mixing along with water deposits in the EGR cooler. If the compressor speed is above the threshold compressor speed, then dislodged particulate matter from the direct injection in the EGR cooler may be carried to the turbocharger and damage the compressor blades. Fluid availability may be measured with a suitable fluid-level gauge. A liquid fluid phase may be determined by measured engine temperature being greater than a threshold engine temperature (e.g., 5° C.). In further embodiments, water availability from a water reservoir coupled to a heater may be determined by measured heater temperature being above a threshold heater temperature (e.g., 3° C.). The method proceeds to 210 if water injection conditions are met. However, the method proceeds to 206 if water injection conditions are not met and the controller maintains current engine operating parameters as described above.

At 210, the controller estimates a maximum injection rate. Factors that may affect the maximum injection rate include, but are not limited to condensate levels in one or more segments of an induction system and/or an engine combustion stability threshold. The injection rate may be defined by a mass over time (e.g., 5 kg/hr). The induction system may include a compressor, charger air cooler, and intake manifold, as well as the intake passage fluidically coupling the compressor, charge air cooler, and intake manifold. Condensate levels within the induction system may be calculated by measuring a dew point temperature at a suitable location in the induction system. As an example, in a low pressure EGR (LPEGR) system, the condensate levels in the intake passage pre-compressor, intake passage post-charge air cooler, and intake manifold may affect the maximum water injection rate. As another example, for a high pressure EGR (HPEGR) or naturally aspirated EGR (NAEGR) system, condensate levels in the intake manifold may affect the maximum water injection rate.

The engine combustion stability threshold may include a maximum engine dilution tolerance above which combustion stability issues may occur (e.g., knock, misfire, etc.). A total dilution provided to the engine may be controlled to be less than the engine dilution tolerance maximum, in order to avoid combustion stability issues. The total dilution is equal to a sum of the EGR flow rate and the amount of fluid injected. The amount of fluid injected is adjusted according to the EGR flow rate and the engine combustion stability threshold, so that a total dilution may be less than the engine dilution tolerance maximum.

At 212, the method includes adjusting the EGR flow rate responsive to the direct injection rate. The EGR flow rate may decrease as the direct injection rate increases. The adjusting may further include reducing the EGR flow rate to a minimum flow rate as the direct injection rate is increased to a maximum rate. In one example, the minimum EGR flow rate may be a predetermined minimum flow rate that is able to carry fluid from the EGR cooler into the engine.

At 214, the method includes the direct injection of water into an inlet of the EGR cooler. As described above, the direct injection rate is based on the EGR flow rate and condensate levels in the induction system. At 216, the controller determines if cleaning is complete. A clean EGR cooler may be estimated by injecting a predetermined amount of fluid (e.g., 100 mL) or by injecting the fluid for a predetermined amount of time (e.g., 30 seconds). A clean EGR cooler may also be estimated by measuring the exhaust pressure upstream and downstream of the EGR cooler. If the pressures are substantially equal, then the EGR cooler may be determined to be clean. If the EGR cooler is not clean, then the method returns to 210. If the EGR cooler is clean, the method may exit.

Figure 3:
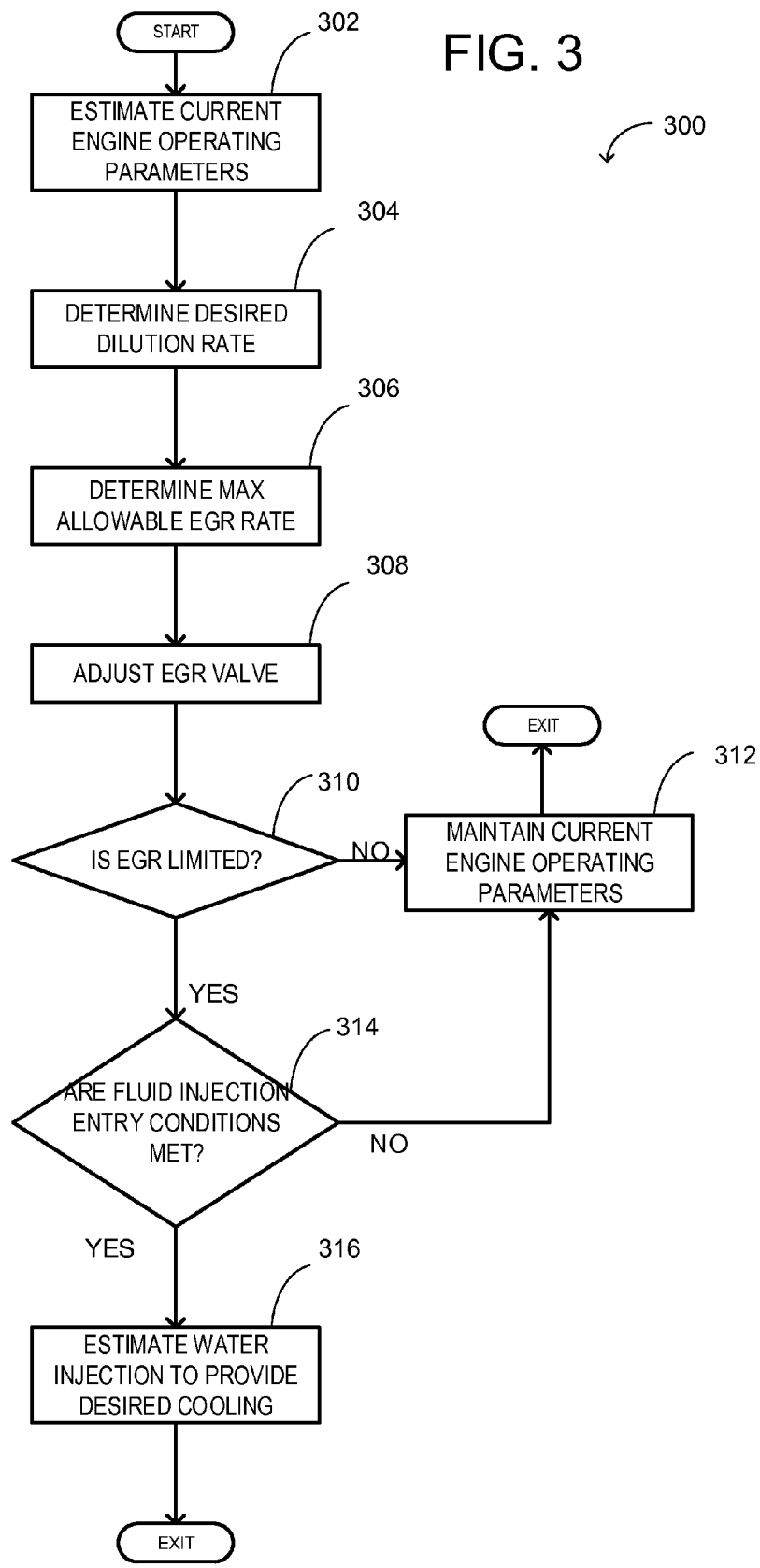
FIG. 3 shows a flow chart illustrating an example method supplementing EGR flow with a water injection.

FIG. 2 demonstrates an example method for cleaning an EGR cooler with a fluid injection. The fluid injection may also be used to supplement EGR flow to an engine during instances of reduced EGR flow. FIG. 3 is a flow chart illustrating an exemplary method 300 for a fluid injection supplementing an EGR flow.

Method 300 will be described herein with reference to components and systems depicted in FIG. 1, particularly, water reservoir 161, conduit 159, direct injector 157, and LP EGR cooler 158. Method 200 may be carried out by a controller (e.g., controller 12) according to computer-readable media stored thereon. It should be understood that the method 200 may be applied to other systems of a different configuration without departing from the scope of this disclosure.

Method 300 may begin at 302, which includes estimating current engine operating parameters. The engine operating conditions may include, but are not limited to engine speed, engine load, engine temperature, and commanded air/fuel ratio. At 304, the method includes determining a desired dilution demand based on the current engine operating parameters (e.g., engine speed and load). The engine dilution demand may be determined based on a variety of factors, including but not limited to $NO_x$ formation, engine temperature, and air/fuel ratio. The desired dilution rate may also be determined by an optimal fuel economy for the engine.

At 306, the method may include determining a maximum allowable EGR rate to meet the desired dilution rate. The maximum allowable EGR rate may be based on thermal constraints. The thermal constraints may include one or more of a radiator temperature, an EGR cooler coolant temperature, and an EGR temperature. The maximum allowable EGR rate may be reduced if the radiator temperature is greater than a threshold radiator temperature, the EGR cooler coolant temperature is greater than a threshold coolant temperature, and the EGR temperature is greater than a threshold EGR temperature. As an example, in an LPEGR system, EGR temperatures above the threshold EGR temperature may lead to oil coking of the compressor blades or damage to plastic air induction tubes in the turbocharger compressor outlet. As another example, the EGR coolant temperature being greater than the threshold EGR coolant temperature may lead to EGR cooler damage. As an alternative example, excessive heat transfer from EGR gas to the EGR cooler coolant may cause the radiator temperature to be greater than a threshold radiator temperature, wherein a vehicle may overheat due to high radiator temperatures. Thus, even if the engine is capable of receiving a higher rate of EGR, due to thermal constraints in the EGR system, the EGR rate may be limited to the maximum allowable EGR rate to avoid damage to engine components.

At 308, the method includes adjusting an EGR valve to provide a dilution demand determined above by the thermal constraints. In other words, the EGR valve is adjusted to provide the maximum allowable EGR rate determined by thermal constraints to meet a dilution demand. The method proceeds to 310 wherein the method includes determining if the maximum allowable EGR flow rate meets the dilution demand. If the maximum allowable flow rate is unable to meet the dilution demand due to thermal constraints (e.g., the EGR flow is limited), then the method proceeds to 314, which will be explained below. If the maximum allowable EGR rate is able to meet engine dilution demands, then the method proceeds to 312. At 312, the method may include maintaining current engine operating parameters and not performing the water injection to meet a dilution demand. The method may exit.

At 314, the method includes determining if fluid injection entry conditions are met. The fluid injection conditions may include EGR temperature being above a threshold temperature, an availability of fluid in the reservoir coupled to the direct injector (e.g., the fluid level exceeding a threshold level and being in a liquid phase), and a compressor speed being below a threshold speed, as described above with respect to FIG. 2. However, when performing the direct injection to supplement EGR flow to meet a dilution demand, the threshold compressor speed may be omitted if a particulate matter load in the EGR cooler is below a threshold particulate matter load. Determination of the particulate matter load in the EGR cooler is described above with respect to FIG. 2. If the fluid injection conditions are met, then the method proceeds to 316. However, if fluid injection conditions are not met for any of the reasons listed above, then the method loops back to 312 to maintain current engine operating parameters as described above. The method may exit.

At 316, the method may include estimating a fluid injection amount to meet the dilution demand. The fluid injection amount may be calculated by comparing the dilution demand to the maximum allowable EGR rate. This process will be discussed in further detail in FIG. 4. The method may exit.

Figure 4:
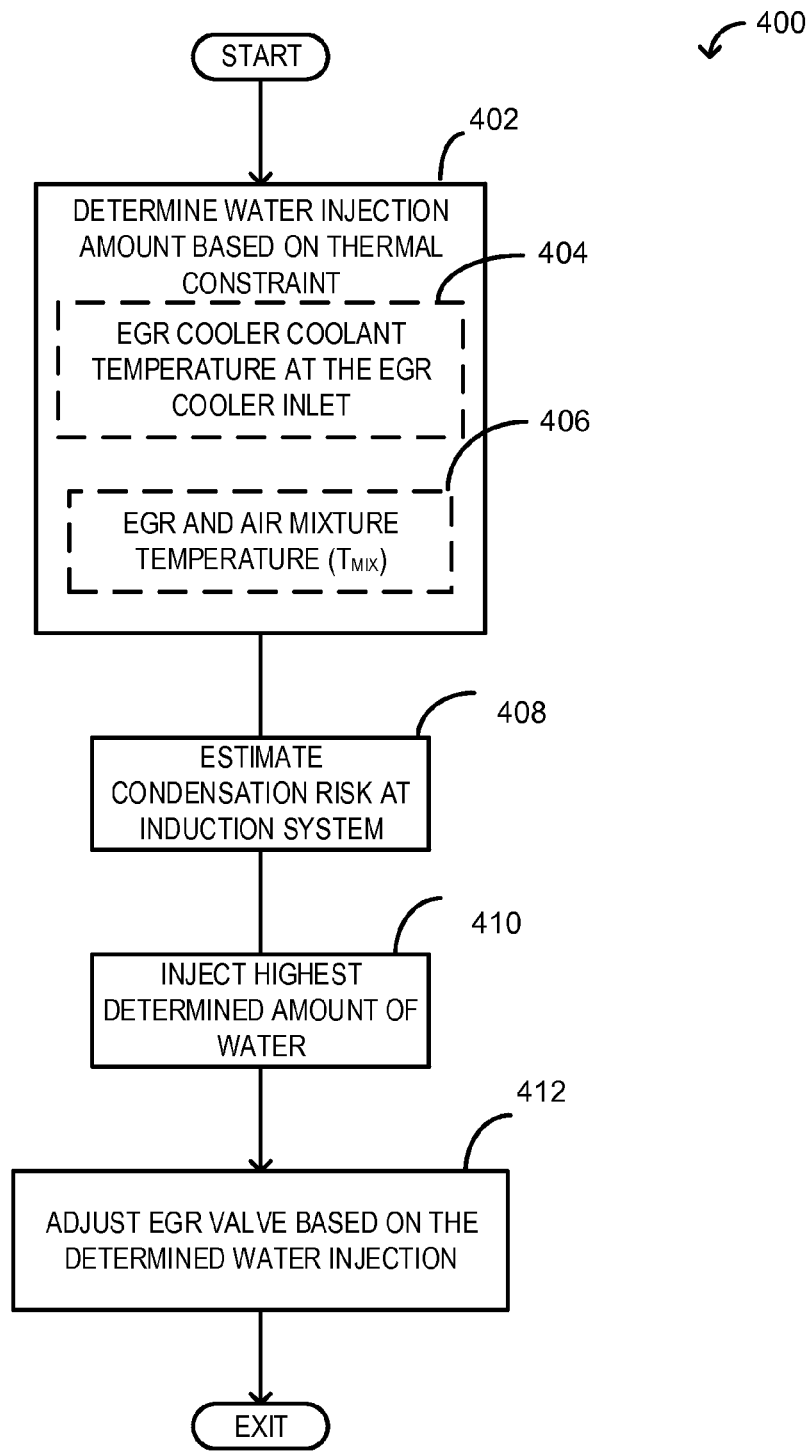
FIG. 4 shows a flow chart illustrating an example method for determining an amount of water to inject based on thermal constraints.

FIG. 3 is a high-level flow chart describing conditions for the water injection to supplement the maximum allowable EGR flow. FIG. 4 further describes the water injection and illustrates the calculation of a mass of water to inject based on thermal constraints and condensate levels in an induction system.

FIG. 4 is a flow chart illustrating method 400. Method 400 is an exemplary method for determining an amount of water to inject based on EGR flow rate and condensate levels. Method 400 may proceed subsequent to method 300.

Method 400 will be described herein with reference to components and systems depicted in FIG. 1, particularly, water reservoir 161, conduit 159, direct injector 157, and LP EGR cooler 158. Method 400 may be carried out by a controller (e.g., controller 12) according to computer-readable media stored thereon. It should be understood that the method 400 may be applied to other systems of a different configuration without departing from the scope of this disclosure.

Method 400 may begin at 402, which includes determines a water injection amount based on thermal constraint(s). The thermal constraints include but are not limited to an EGR cooler coolant temperature at an EGR cooler inlet 404 and an EGR and air mixture temperature ($T_{MIX}$) 406. The EGR cooler coolant above a threshold coolant temperature may cause a radiator to overheat. The overheated radiator is unable to provide the desired cooling to the engine and as a result, engine components may be damaged. The EGR cooler coolant above a threshold coolant temperature may boil, and as a result, the EGR cooler may be damaged.

As EGR flows to the engine inlet, it mixes with atmospheric air upstream of a compressor. As this gaseous mixture passes through the compressor, its pressure and temperature are increased. Therefore, if the temperature upstream of the compressor where the atmospheric air and EGR mix ($T_{MIX}$) is greater than a threshold, then the temperature downstream of the compressor may be too high and damage engine parts. As a result, $T_{MIX}$ is estimated based on an EGR temperature and an air intake temperature and included in the determination of the water injection amount.

As determined in method 300, the maximum allowable EGR rate is unable to fulfill the current engine dilution demand due to thermal constraints and a water injection may supplement this dilution shortfall. The dilution shortfall may be calculated by finding the difference between the engine dilution demand (e.g., a desired EGR rate) and the maximum allowable EGR rate. The dilution shortfall is equal to the sum of a mass of additional EGR ($M_{AEGR}$) and the mass of injected water ($M_f$). $M_f$ is equal to 1.7 $M_{AEGR}$ because water is a more effective diluent than EGR (e.g., 1 gram of water dilutes an engine combustion mixture as well as 1.7 grams of EGR). Therefore, both $M_f$ and $M_{AEGR}$ may be calculated and used in Equation 1. For instances where water is not the fluid injected and a mixture is being used, the 1.7 coefficient would change to a predetermined value based on the fluid mixture. The change in temperature of EGR may be determined by the following equation, which applies to both thermal constraints listed above:

$$\frac{M_f \times \Delta H_{VAP}}{M_{AEGR} \times C_{EGR}} = \Delta T_{EGR} \qquad \text{Equation 1}$$

$M_f$ represents the mass of fluid to inject, $M_{AEGR}$ represents the mass of additional EGR, $C_{EGR}$ represent the specific heat of EGR, $\Delta T_{EGR}$ represents the change in EGR temperature across the EGR cooler, and $\Delta H_{VAP}$ represents the specific heat of vaporization of the injected fluid. The mass of additional EGR denotes the increase in EGR rate due to the water injection. The water injection transfers heat (cools) both the EGR cooler coolant and EGR gas temperature. As a result, the thermal constraints are reduced and the maximum allowable EGR rate is increased. The method may include calculating a change in temperature of EGR for each of the thermal constraints described above. As an example, if an engine dilution demand results in a requested EGR rate of 100 kg/hr, but the maximum allowable EGR rate can provide only 75 kg/hr due to thermal constraints, then a water injection may occur to meet the additional 25 kg/hr dilution demand. However, as the water is injected to the EGR cooler, the water cools the EGR cooler and/or EGR, thus allowing an increase in the maximum allowable EGR rate. Additionally, the water is a more effective diluent than EGR, so proportionally the mass of water will be lower. Therefore, the water injection amount is calculated using the equations above and the amount of water injected is accounted for in the remaining 25 kg/hr. For example, the calculated amount of water injected may equal to 4 kg/hr of the total dilution demand enabling the additional EGR flow to cover the remaining 18 kg/hr dilution demanded. In this example, the injected water rate and the additional EGR flow rate are less than 25 because water is a more effective diluent (e.g., 18+1.7(4)≃25).

At 408, the method includes estimating a predicted condensation level in an induction system based on a dew point calculation at one or more suitable locations within the induction system. In a low pressure EGR system, the one or more locations may include the intake passage upstream of the compressor (e.g., pre-compressor), the intake passage downstream of the charge air cooler (e.g., post-charge air cooler), and the intake manifold. In a high pressure EGR system or naturally aspirated EGR system, the location may include the intake manifold. If the predicted condensation level is above a threshold, the amount of water injected may be reduced to prevent further condensation.

At 410, the method includes injecting the highest determined amount of water. The controller may analyze all thermal constraints affecting the maximum allowable EGR flow rate and determine the highest amount of water based on the calculation of the thermal constraint having the greatest effect on EGR flow. The highest determined amount of water for injection is adjusted based on the condensation level estimation.

At 412, the method includes adjusting the EGR flow rate to an increased rate determined by the water injection amount. The method may exit.

FIGS. 2-4 represent different scenarios for water injection. However, water injection in either scenario is dependent on a variety of conditions. These conditions and their consequences are further illustrated in FIGS. 5-6.

Figure 5:
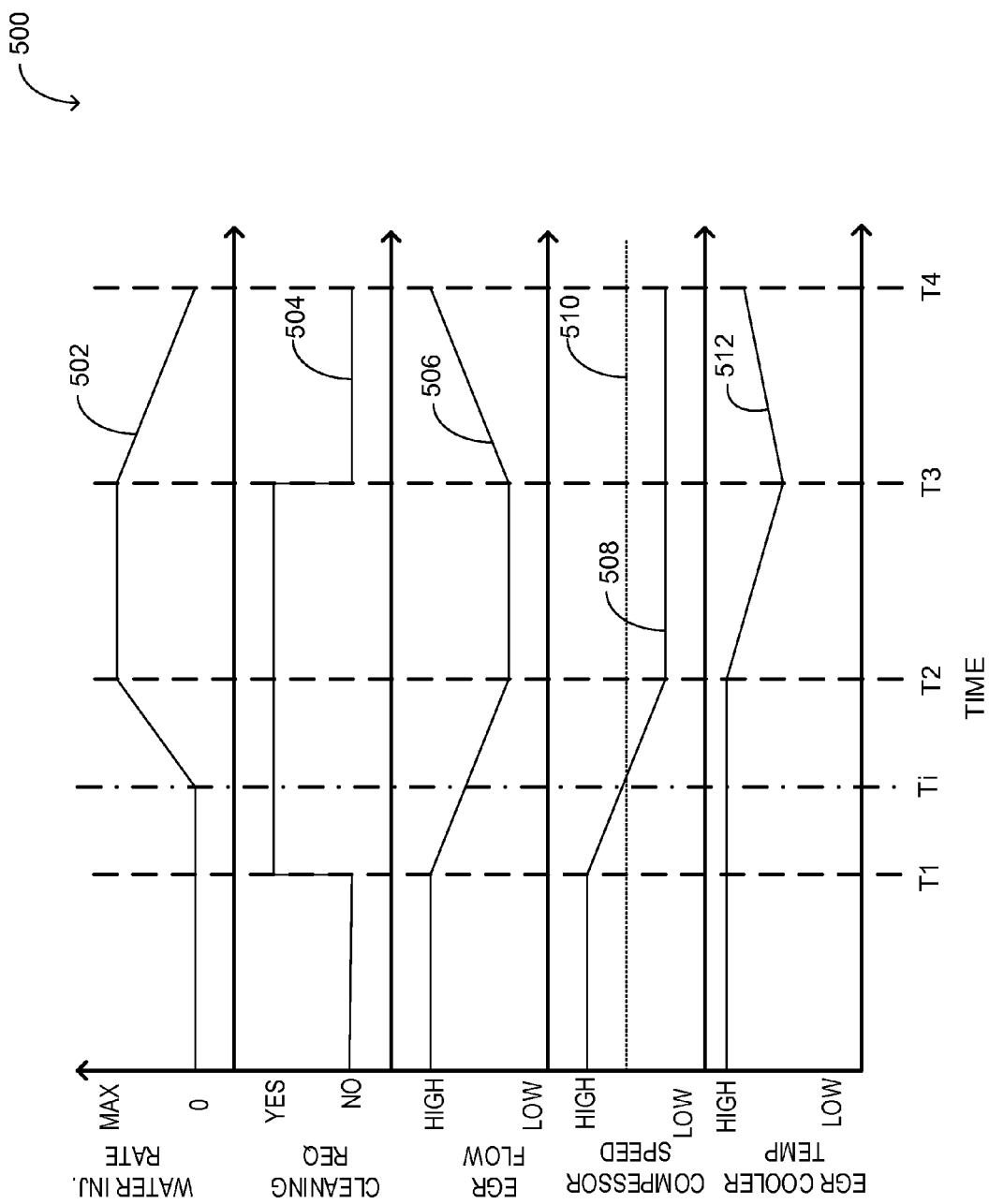
FIG. 5 shows a series of plots illustrating cleaning an EGR cooler with a water injection rate against a variety of engine conditions.

FIG. 5 illustrates plot 500 of various engine conditions affecting EGR cooler direct injection rate and EGR rate. It should be understood that the examples presented in FIG. 5 are illustrative in nature, and other outcomes are possible. For example, additional or alternative engine parameters may affect the amount of water injected to the EGR cooler. Further, the amount of water injected in the illustrated examples may be different in other examples.

The graphs in FIG. 5 represent various operating parameters and resultant engine controls for cleaning an EGR cooler. The x-axis represents time and the y-axis represents the respective engine condition being demonstrated. On plot 500, graph 502 represents a water injection rate, graph 504 represents an EGR cooler cleaning demand, graph 506 represents an EGR flow rate, graph 508 represents a compressor speed with line 510 representing a predetermined threshold for the compressor speed, and graph 512 represents an EGR cooler temperature.

Plot 500 will be described herein with reference to components and systems depicted in FIG. 1, particularly, water reservoir 161, conduit 159, direct injector 157, and LP EGR cooler 158. Plot 500 may be measured by a controller (e.g., controller 12) according to computer-readable media stored thereon.

Prior to T1, the water injection 502 is disabled because an EGR cleaning demand is not detected (as illustrated by graph 504) nor are there thermal constraints reducing EGR flow rate. The EGR flow rate 506 is high to meet an engine dilution demand and as a result increases the EGR cooler temperature 512. At T1, the controller determines a cleaning demand for the EGR cooler. As a result, EGR flow begins to decrease to a minimum allowable EGR flow rate that is able to carry the vaporized fluid to the engine. The compressor speed begins to decrease in response to a decrease in engine load (as illustrated by graph 508). EGR cooler temperature remains high to due to high EGR flow and no direct injection of water. The water injection is suspended previously due to the compressor speed being above a threshold.

After T1 and prior to T2, the compressor speed falls below a threshold and the fluid injection begins at T1, increasing to a maximum fluid injection rate while the EGR flow rate decreases to a minimum allowed EGR flow rate simultaneously. The minimum allowed EGR flow rate is based on a lowermost EGR flow rate threshold wherein the EGR may still carry a fluid from the EGR cooler to the engine. The EGR cooler temperature remains high. At T2, the fluid injection rate has reached the maximum rate and the EGR flow rate has reached the minimum allowable value. The compressor speed is low. EGR cooler temperature begins to decrease due to the direct injected fluid into the EGR cooler. As seen in this example, engine load is low during the EGR cooler cleaning. However, it may be appreciated by one skilled in the art that the EGR cooler cleaning may initiate during other instances so long as the direct injection conditions, listed above in FIG. 2, are met.

After T2 and prior to T3, the fluid injection continues at a maximum rate responsive to the EGR cooler cleaning demand determined by the controller. As an example, a cleaning operation may conclude after either a predetermined amount of time or a predetermined volume of fluid injected. The EGR flow continues at a minimum flow rate, the compressor speed remains low, and the EGR cooler temperature continues to decrease due to the fluid injection. At T3, the controller no longer determines a cleaning demand and the water injection rate begins to decrease. The EGR flow rate begins to increase to meet an engine dilution demand and as a result, EGR cooler temperature begins to increase. Compressor speed remains below a threshold.

After T3 and prior to T4, the fluid injection rate is decreased and the EGR flow rate is increased. Specifically, the fluid injection rate is decreased proportional the rate of EGR flow increase to meet an engine dilution demand. As an example, the direct injection rate may decrease slowly based on the increasing rate of EGR flow. Additionally or alternatively, the direct injection rate may decrease rapidly responsive to a rapidly increasing EGR flow rate. EGR cooler temperature continues to increase and the compressor speed remains low. At T4, the fluid injection has halted and the EGR flow rate is at the maximum allowable value to meet engine dilution demands. The EGR cooler does not demand a cleaning operation, compressor speed remains low, and the EGR cooler temperature increases due to the increased flow of EGR through the heat exchanger.

Figure 6:
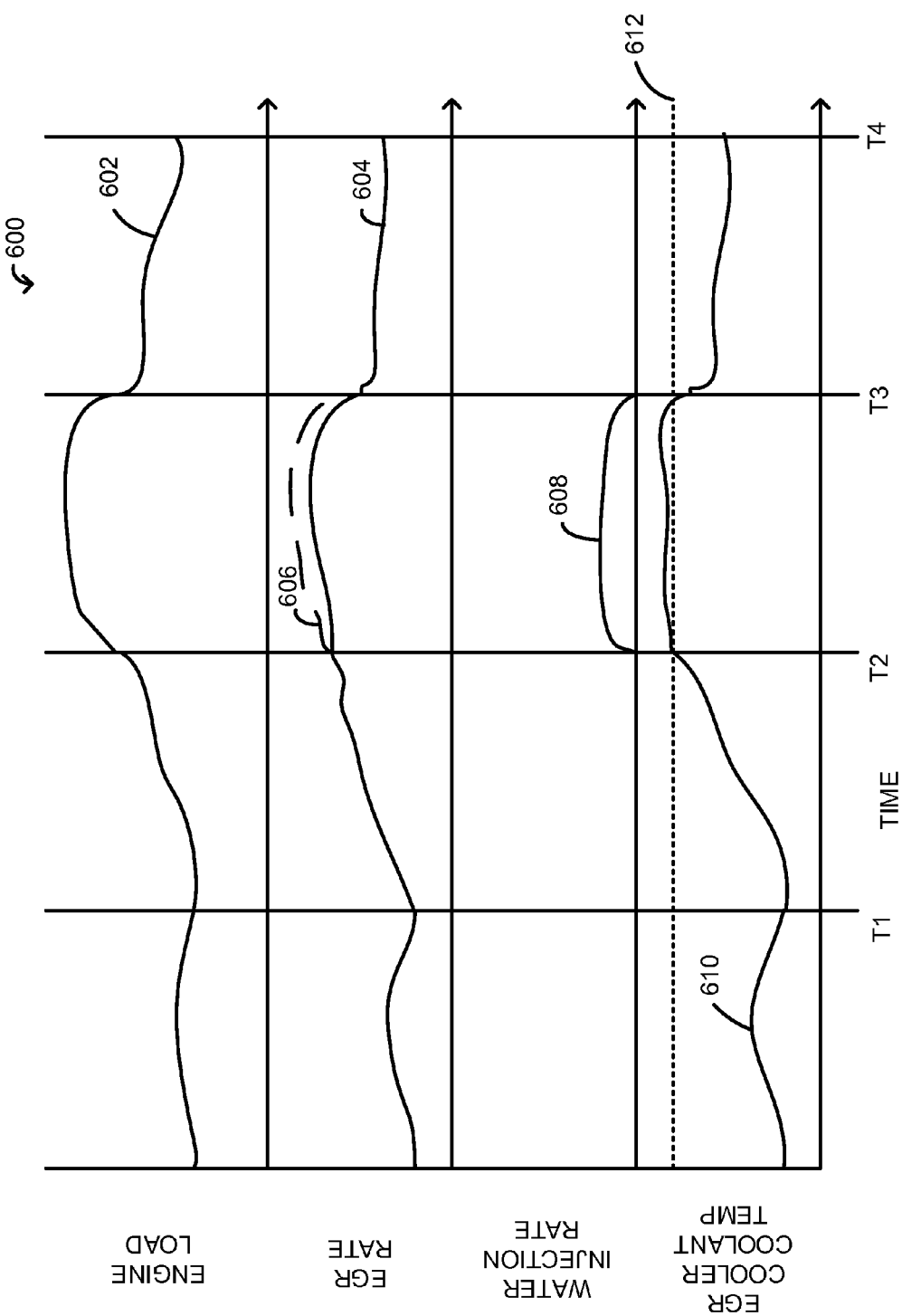
FIG. 6 shows a series of plots illustrating supplementing EGR flow with a water injection against a variety of conditions.

FIG. 6 illustrates plot 600 of examples and outcomes for a fluid injection into an EGR cooler to supplement EGR flow to meet an engine dilution demand. It should be understood that the examples presented in FIG. 6 are illustrative in nature, and other configurations are possible. For example, additional or alternative engine parameters may affect the amount of water injected to the EGR cooler. Further, the amount of water injected in the illustrated examples may be different in other examples.

The graphs in FIG. 6 represent various operating parameters and resultant engine controls for meeting an engine dilution demand based on a maximum allowable EGR flow and fluid injection. The x-axis represents time and the y-axis represents the respective engine condition being measured. Graph 602 represents an engine load, graph 604 represents an EGR flow rate and graph 606 represents a desired EGR flow rate, graph 610 represents EGR cooler coolant temperature with line 612 representing a threshold coolant temperature. An EGR cooler temperature has been omitted from FIG. 6. However, it may be assumed that the EGR cooler temperature is substantially equal to the coolant temperature. Further, compressor speed has also been omitted from the example. As a result, it may be assumed that a particulate load in the EGR cooler is below a particulate load threshold, wherein a water injection would not be able to damage compressor blades at a speed above a threshold compressor speed. However, if particulate matter was above the threshold particulate load, then compressor speed may be considered for the injection of fluid.

Plot 600 will be described herein with reference to components and systems depicted in FIG. 1, particularly, water reservoir 161, conduit 159, direct injector 157, and LP EGR cooler 158. Plot 600 may be measured by a controller (e.g., controller 12) according to computer-readable media stored thereon.

Prior to T1, the water injection is disabled (shown by graph 608). The water injection may be disabled due to an engine dilution being met the current EGR flow rate (shown by graphs 604 and 606). As shown by graphs 602 and 606, the desired EGR rate (e.g., dilution demand) tracks the engine load. That is to say, as the engine load increases, the desired EGR rate increases. The EGR cooler coolant temperature is below a threshold EGR cooler coolant temperature (as shown by graph 610 and line 612). The EGR cooler coolant temperature tracks the EGR rate, wherein as the EGR rate increases, the EGR cooler coolant temperature increases. At T1, the engine load begins to increase. As a result, the desired EGR rate increases. The EGR cooler coolant temperature remains below the threshold and therefore, the EGR flow rate may meet the desired EGR rate.

After T1 and prior to T2, engine load increases, desired EGR rate increase, the EGR flow rate increases and tracks the desired EGR rate, and the EGR cooler coolant temperature increases while remaining below the threshold EGR cooler coolant temperature.

At T2, the EGR cooler coolant temperature increases to a temperature above the upper threshold EGR cooler coolant temperature. As a result, the EGR flow rate is a maximum allowable EGR flow rate and is unable to meet the desired EGR flow rate. The maximum allowable EGR flow rate is determined by thermal constraints (e.g., an EGR cooler coolant temperature being above a threshold EGR cooler coolant temperature), described above with respect to FIG. 3. The water injection is initiated because of the EGR flow rate being less than the desired EGR flow rate. Adjusting the amount of water direct injected may be based on the EGR cooler coolant temperature being above the threshold EGR cooler coolant temperature.

After T2 and prior to T3, the water injection rate resembles the engine load. In other words, during an instance where a maximum EGR flow rate is unable to meet a desired EGR flow rate, the water injection rate increases as engine load increases. The maximum allowable EGR flow rate increases due to the water injection negating the effects of the thermal constraint (e.g., the EGR cooler coolant temperature being greater than the threshold EGR cooler coolant temperature). Although the increased maximum allowable EGR flow rate is still unable to meet all of the desired EGR rate, it does however meet a majority of the desired EGR flow rate. The water injection meets the remainder of this difference (e.g., a dilution shortfall) as discussed above, with respect to FIGS. 3 and 4. The coolant temperature above and/or at the threshold, but no longer increases with the increasing maximum allowable EGR rate.

At T3, the engine load begins to decrease and as a result, the desired EGR rate decreases to a rate that the maximum allowable EGR rate is able to meet. Therefore, the water injection is disabled due to an engine dilution demand (e.g., desired EGR rate) being met. The EGR cooler coolant temperature decreases to a temperature less than the threshold EGR cooler coolant temperature. After T3 and prior to T4, the engine load continues to decrease, therefore, the desired EGR rate also decreases. The EGR flow rate is able to meet the desired EGR rate. The EGR cooler coolant temperature remains below the threshold and tracks the EGR flow rate. The water injection remains disabled.

Figure 7:
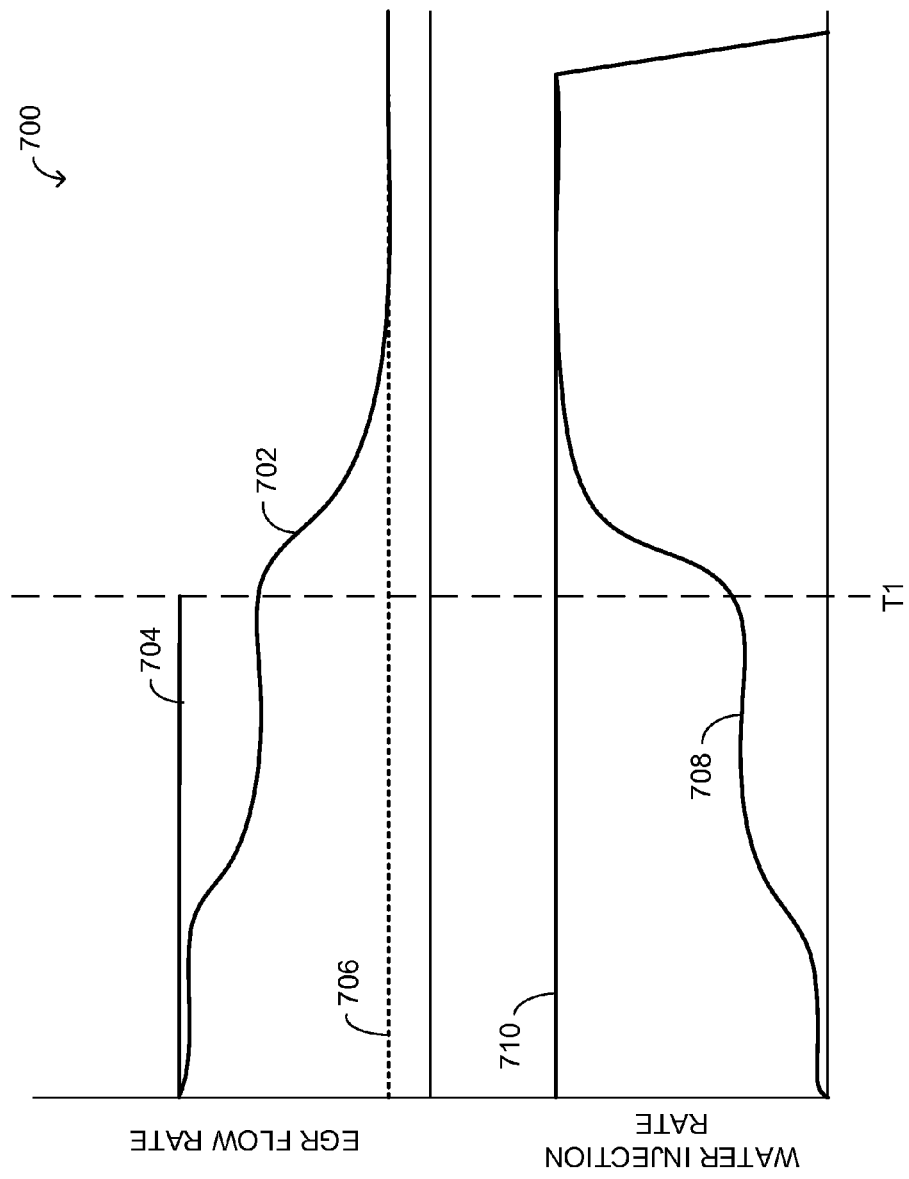
FIG. 7 shows graphs depicting a cause and effect of EGR flow and direct injection rate based on a maximum allowable EGR flow and an EGR cooler cleaning.

FIG. 7 includes graph 700 illustrating an EGR flow rate graph 702 and a water injection rate graph 708. The EGR flow rate graph 702 includes an engine dilution demand 704 and a minimum allowable EGR flow rate 706. The water injection rate graph 708 includes a maximum water injection rate 710.

Prior to T1, the EGR flow rate decreases to a rate below the engine dilution demand. This may be due to thermal constraints. A controller (e.g., controller 12) may detect thermal constraints above an optimal temperature and signal an EGR valve to adjust EGR flow rate to a maximum allowable flow rate to prevent engine damage. As a result, the maximum EGR flow rate is unable to meet the engine dilution demand and a direct injection of water is initiated to supplement EGR flow. The water injection rate is determined by the difference between the dilution demand and the maximum allowable EGR flow rate (e.g. a dilution demand). The water injection rate increases as the dilution demand increases.

After T1, the controller determines an EGR cooler cleaning demand. The water injection rate begins to increase to a maximum water injection rate as the EGR flow rate decreases to a minimum allowable EGR flow rate. The minimum allowable EGR flow rate is based on a predetermined minimum EGR flow that may carry fluid with it to an engine.

Once the EGR cooler cleaning demand has been fulfilled, the water injection may decrease and/or stop. On graph 708, the water injection rate decreases at a rapid rate and the EGR may be adjusted according to an engine dilution demand.

In this way, direct injection into the EGR cooler provides a mechanism to supplement engine dilution during conditions where EGR flow may be limited, due to high temperatures in the EGR system, for example. By direct injecting into the EGR cooler, EGR cooler and/or EGR temperatures may be decreased, thus allowing for increased EGR rates in response to the water injection to meet engine dilution demands. Further, by direct injecting into the EGR cooler, particulate matter fouling the EGR cooler may be removed, thus eliminating or reducing the need to perform an EGR cooler regeneration. As EGR cooler regeneration typically includes additional fuel injection to raise EGR temperatures, removal of particulate matter via direct injection may increase fuel economy.

The technical effect of performing a water injection at the EGR cooler is to both reduce a particulate load in the EGR cooler to a level below a threshold particulate load and to supplement EGR flow to meet an engine dilution demand. This provides the engine with increased fuel economy and less emission production.

In an embodiment, a method for an engine comprises during select conditions, direct injecting fluid from a reservoir into an EGR cooler. The select conditions include direct injecting a fluid responsive to a particulate load at the EGR cooler being higher than a threshold particulate load. The method, additionally or alternatively, may further include adjusting an EGR flow rate responsive to a direct injecting fluid rate. The adjusting may include the EGR flow rate decreasing as the direct injecting fluid rate increases, further comprising adjusting the EGR flow rate to a minimum flow rate and adjusting a direct injecting flow rate to a maximum flow rate responsive to the particulate load being higher than a threshold particulate load.

Direct injecting fluid into the EGR cooler is based on one or more of a compressor speed and EGR cooler temperature. The select conditions, additionally or alternatively, further include a maximum allowable EGR flow rate being less than a desired EGR flow rate to initiate a direct injection. The direct injection may include direct injecting fluid into the EGR cooler based on one or more of a compressor speed and a particulate load in the EGR cooler being below a threshold particulate load. The maximum allowable EGR flow rate is based on one or more of a radiator temperature being greater than a threshold radiator temperature, an EGR cooler coolant temperature being greater than a threshold coolant temperature, and an EGR temperature being greater than a threshold EGR temperature. Additionally or alternatively, the method may further include increasing a direct injection fluid rate as the maximum allowable EGR flow rate increases.

Another method for an engine comprises during an EGR cooler cleaning mode, adjusting an EGR flow rate to a minimum allowable flow rate and direct injecting water into an EGR cooler. The direct injecting further comprising when a maximum allowable EGR flow rate is less than a dilution demand, flowing EGR at the maximum allowable EGR flow rate and direct injecting the water into the EGR cooler to meet the dilution demand.

The maximum allowable EGR flow rate is based on one or more of a radiator temperature being greater than a threshold radiator temperature, an EGR cooler coolant temperature being greater than a threshold coolant temperature, and an EGR temperature being greater than a threshold EGR temperature. Additionally or alternatively, the method may include flowing EGR at the maximum allowable EGR flow rate and direct injecting the water in the EGR cooler to meet the dilution demand further comprises calculating a mass of fluid and determining an amount of the direct injection of water based on the mass of fluid and the maximum allowable EGR rate. The injection may include direct injecting the water is based on a compressor speed being less than a threshold speed. The method, additionally or alternatively, may include the maximum allowable EGR flow rate increasing and the direct injecting rate increasing.

Another method for an engine comprises adjusting an amount of water direct injected into an EGR cooler responsive to an EGR flow rate and an engine dilution demand. The adjusting, additionally or alternatively, may include adjusting an amount of water direct injected into the EGR cooler responsive to the EGR flow rate being reduced by an EGR temperature in a compressor outlet or an EGR cooler coolant temperature in the EGR cooler. Adjusting the amount of water direct injected, additionally or alternatively, further comprises the EGR temperature in the compressor outlet being estimated by a mixture temperature of an intake air and the EGR.

The adjusting may include the adjusting comprises adjusting the amount of water direct injected at an inlet of the EGR cooler. The method, additionally or alternatively, may include adjusting the amount of water direct injected based on an EGR cooler coolant temperature being above a threshold EGR cooler coolant temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during an EGR cooler cleaning mode, adjusting an EGR flow rate to a minimum allowable flow rate and direct injecting water into an EGR cooler; and
   when a maximum allowable EGR flow rate is less than a dilution demand, flowing EGR at the maximum allowable EGR flow rate and direct injecting the water into the EGR cooler to meet the dilution demand, wherein direct injecting the water is based on a compressor speed being less than a threshold speed.

2. The method of claim 1, wherein the maximum allowable EGR flow rate is based on one or more of a radiator temperature being greater than a threshold radiator temperature, an EGR cooler coolant temperature being greater than a threshold coolant temperature, and an EGR temperature being greater than a threshold EGR temperature.

3. The method of claim 1, wherein the maximum allowable EGR flow rate increases as a direct injecting rate increases.

4. The method of claim 1, wherein flowing EGR at the maximum allowable EGR flow rate and direct injecting the water in the EGR cooler to meet the dilution demand further comprises calculating a mass of fluid and determining an amount of the direct injection of water based on an evaporative cooling load and the maximum allowable EGR flow rate.

5. A method, comprising:
adjusting an amount of water direct injected into an EGR cooler based on a comparison of a maximum allowable EGR flow rate and an engine dilution demand, wherein the amount of water is direct injected into the EGR cooler responsive to a compressor speed being less than a threshold speed and the maximum allowable EGR flow rate being less than the engine dilution demand.

6. The method of claim 5, wherein the maximum allowable EGR flow rate is determined based on an EGR temperature in a compressor outlet or an EGR cooler coolant temperature in the EGR cooler.

7. The method of claim 6, wherein the EGR temperature in the compressor outlet is estimated by a mixture temperature of an intake air and EGR.

8. The method of claim 5, wherein the adjusting comprises adjusting the amount of water direct injected at an inlet of the EGR cooler.

9. The method of claim 5, wherein the adjusting comprises adjusting the amount of water direct injected based on an EGR cooler coolant temperature being above a threshold EGR cooler coolant temperature.

10. The method of claim 5, wherein a water injection rate is increased responsive to an engine load increase if the maximum allowable EGR flow rate is less than the engine dilution demand.

11. The method of claim 6, wherein the EGR temperature decreases responsive to the direct injection of water into the EGR cooler.

12. The method of claim 11, wherein the maximum allowable EGR flow rate increases responsive to the EGR temperature decreasing following direct injection of water into the EGR cooler.

13. The method of claim 5, further comprising disabling direct water injection if the maximum allowable EGR flow rate meets the engine dilution demand.

14. The method of claim 5, further comprising disabling direct water injection if the compressor speed is greater than the threshold speed.

* * * * *